Figure 1:
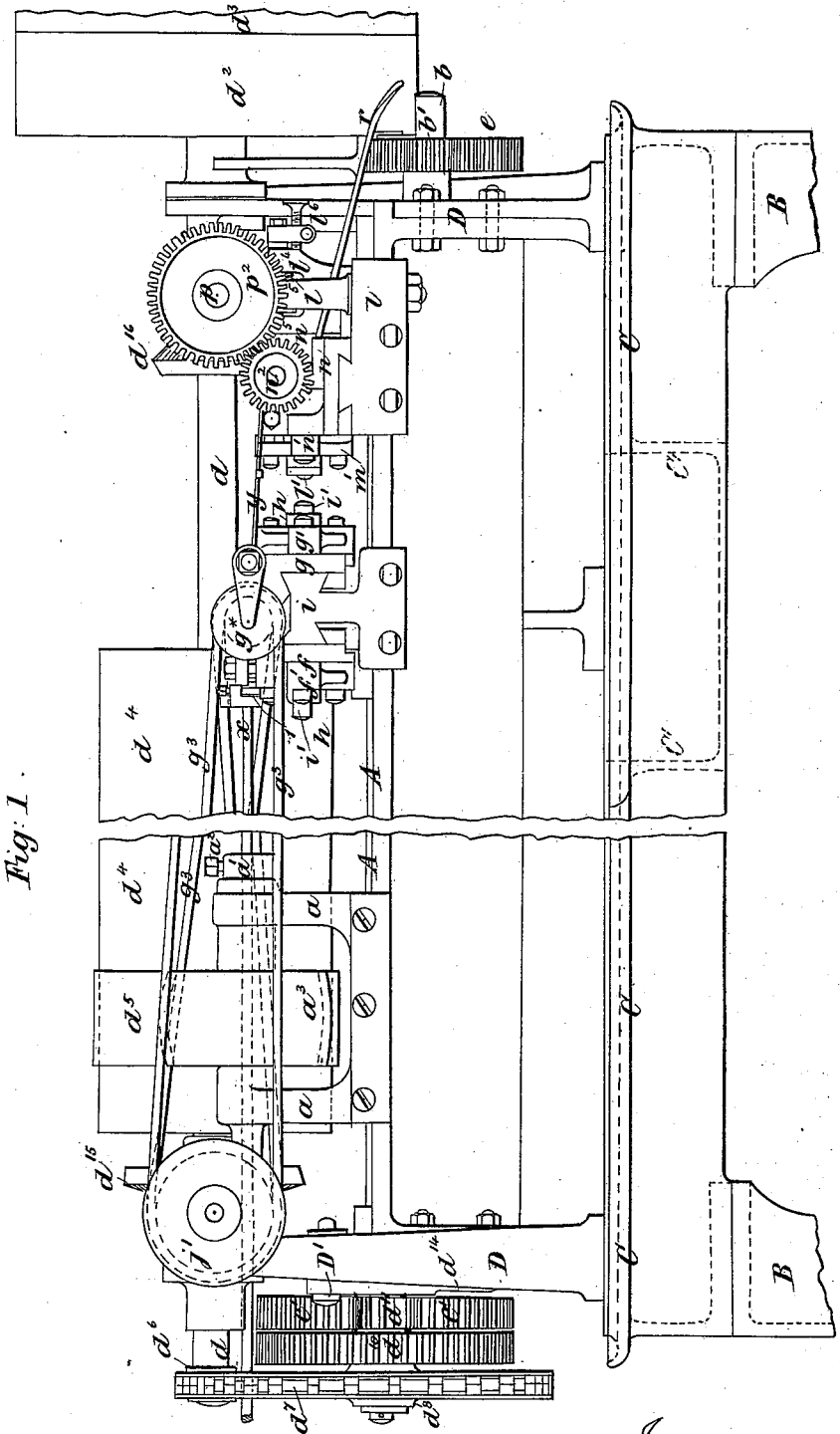

(No Model.) 8 Sheets—Sheet 1.

W. HILLMAN.
MACHINE FOR MAKING BALLS.

No. 333,301. Patented Dec. 29, 1885.

Attest
Edward Starr
Geo. L. Wheelock

Inventor
William Hillman
By Knight Bros
attys (No Model.) 8 Sheets—Sheet 2.
W. HILLMAN.
MACHINE FOR MAKING BALLS.
No. 333,301. Patented Dec. 29, 1885.
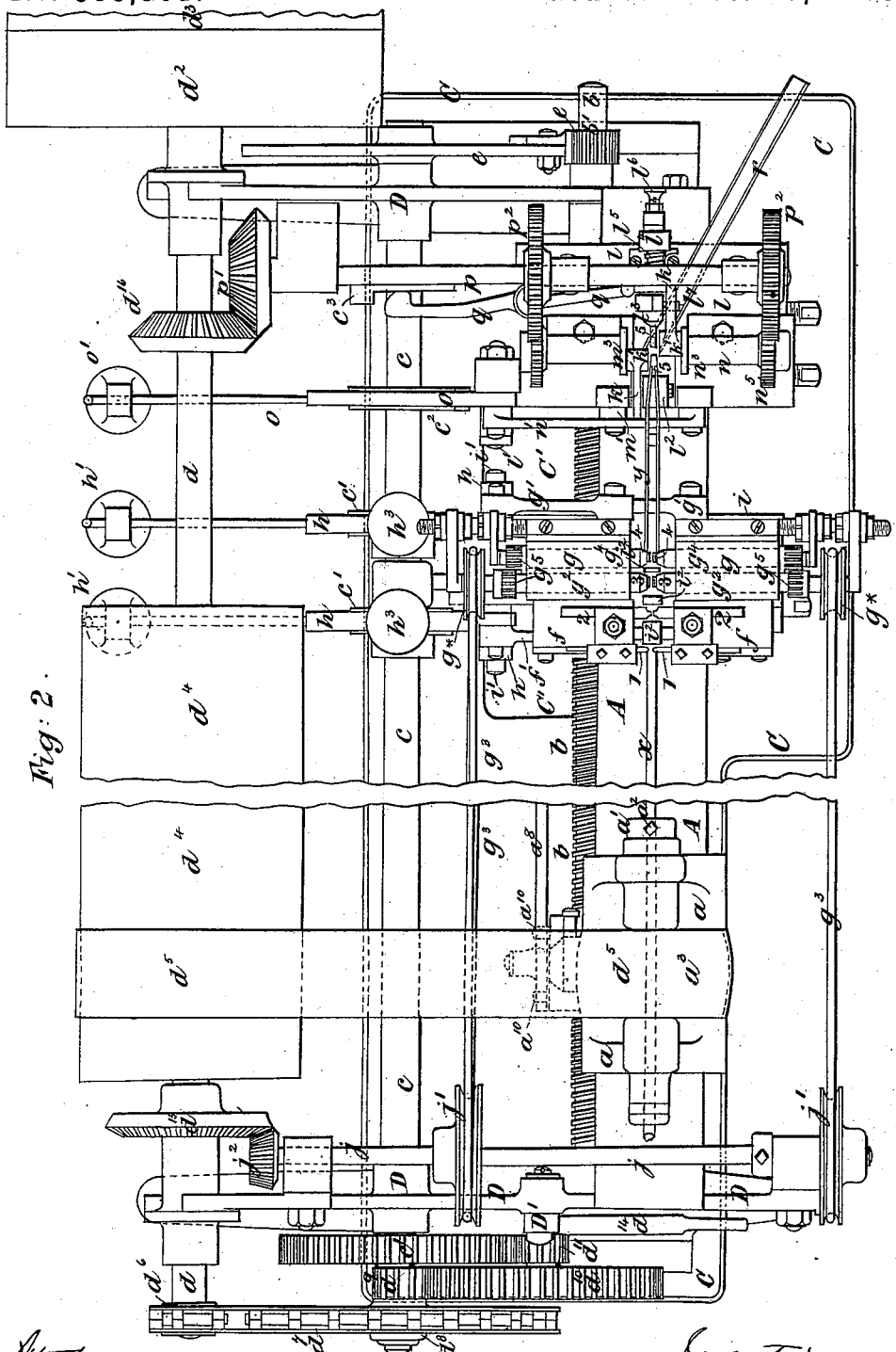
Fig: 2.
Attest
Edward Stern
Geo. L. Wheelock
Inventor
William Hillman
By Knight Bros
Attys

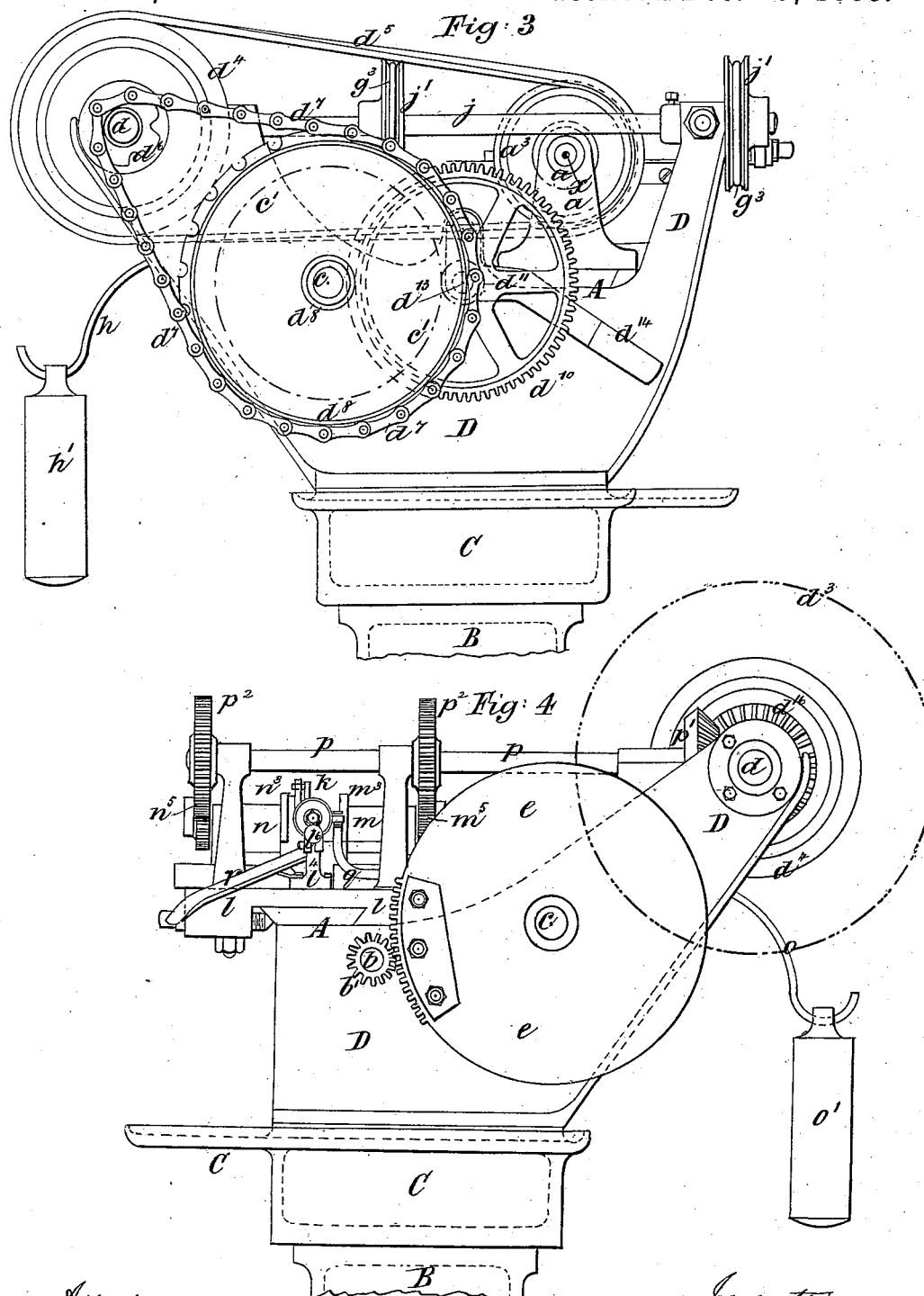

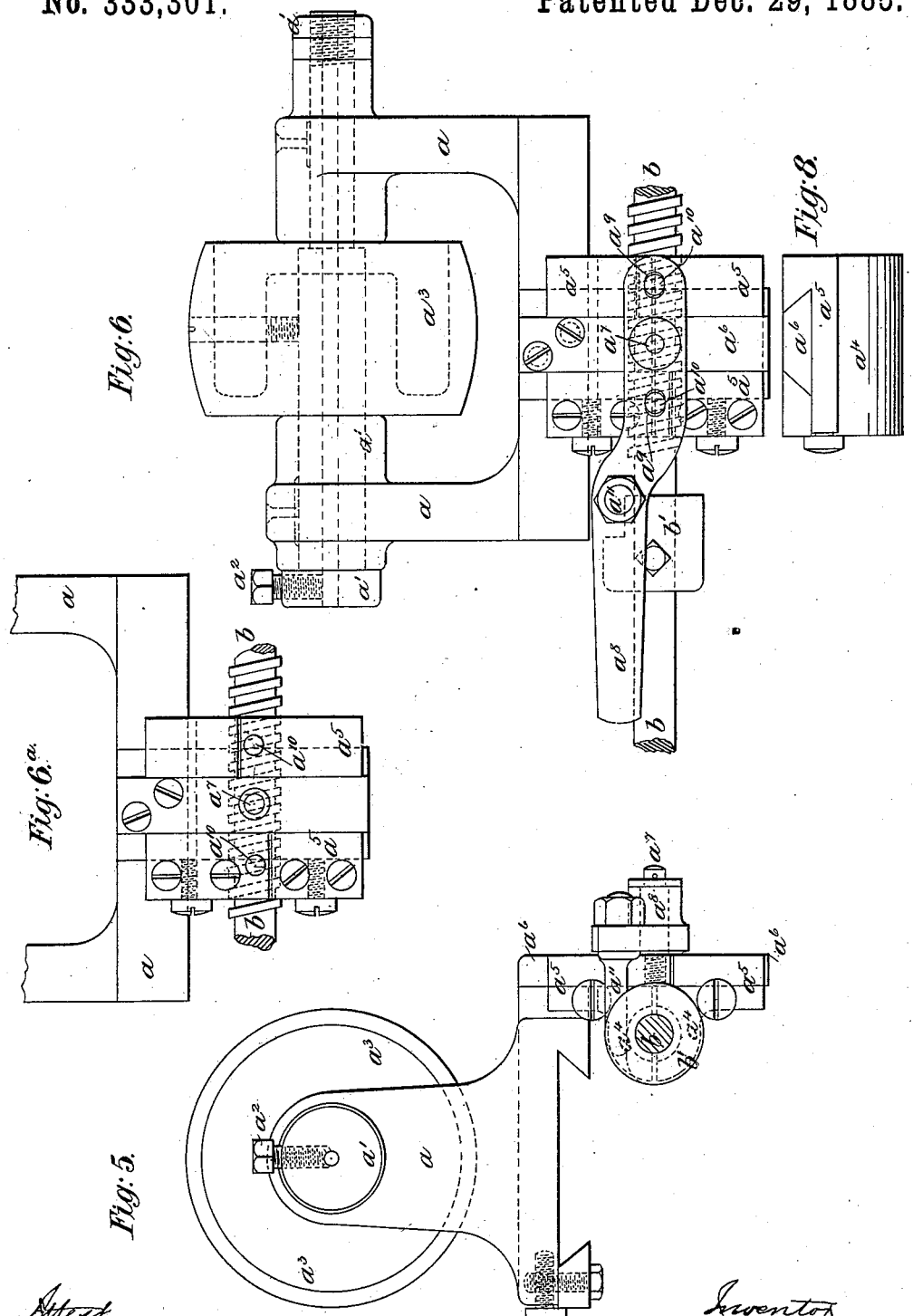

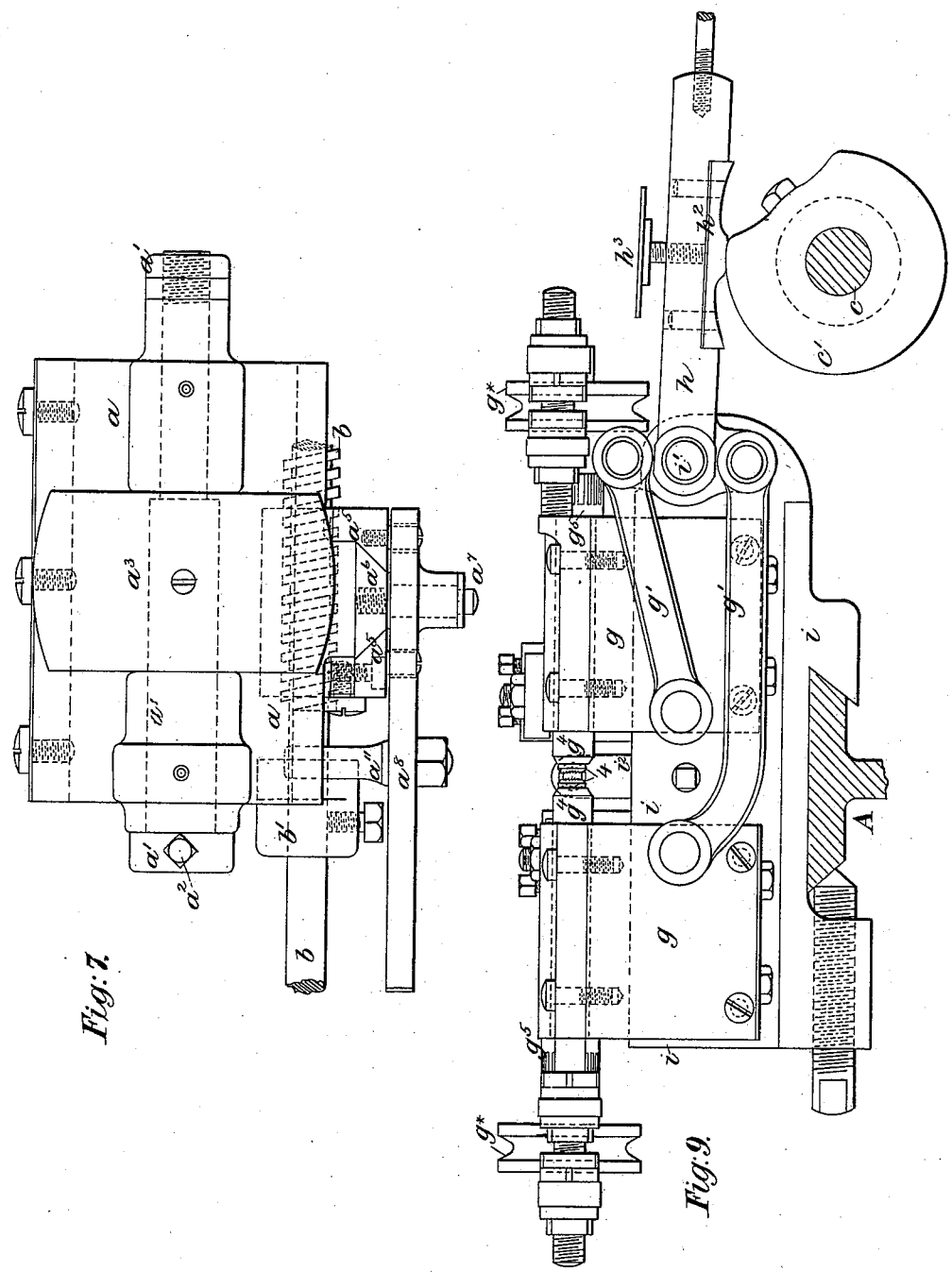

(No Model.) 8 Sheets—Sheet 6.
W. HILLMAN.
MACHINE FOR MAKING BALLS.
No. 333,301. Patented Dec. 29, 1885.
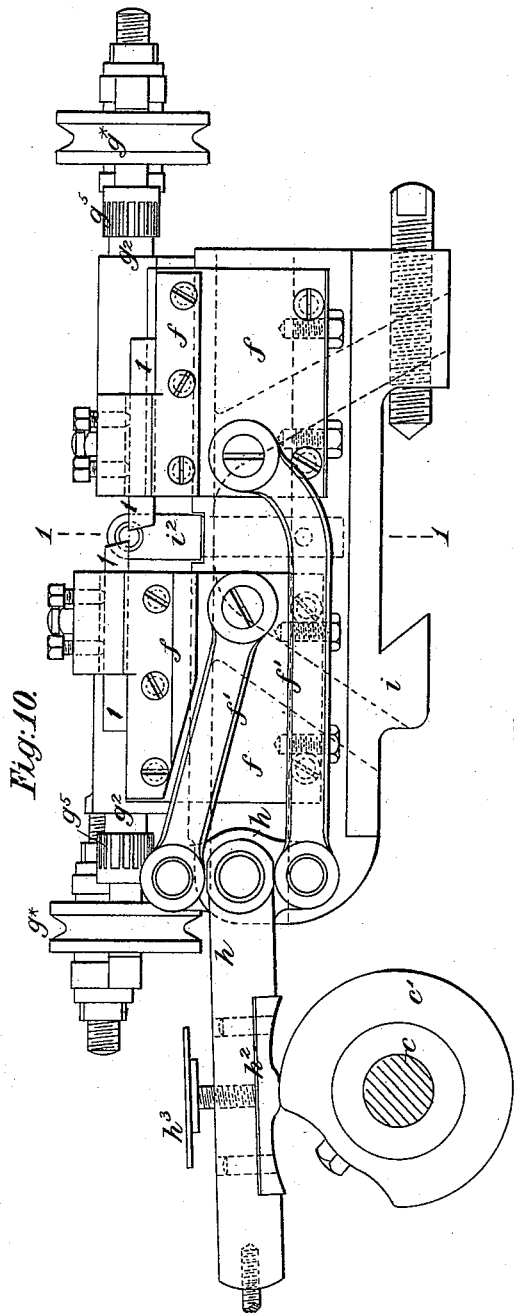
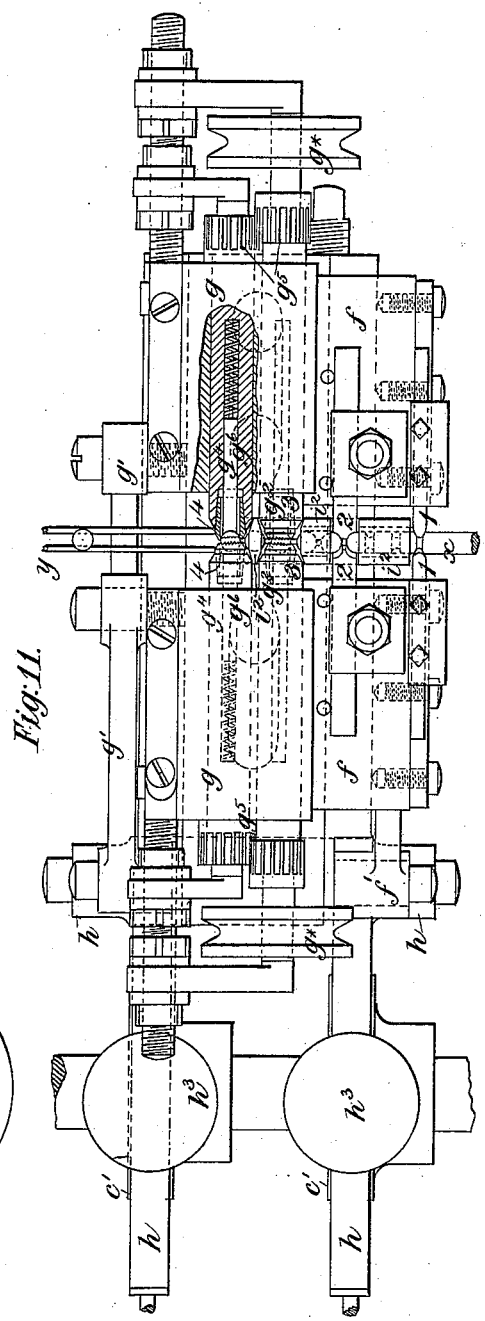

(No Model.) 8 Sheets—Sheet 7.
W. HILLMAN.
MACHINE FOR MAKING BALLS.
No. 333,301. Patented Dec. 29, 1885.
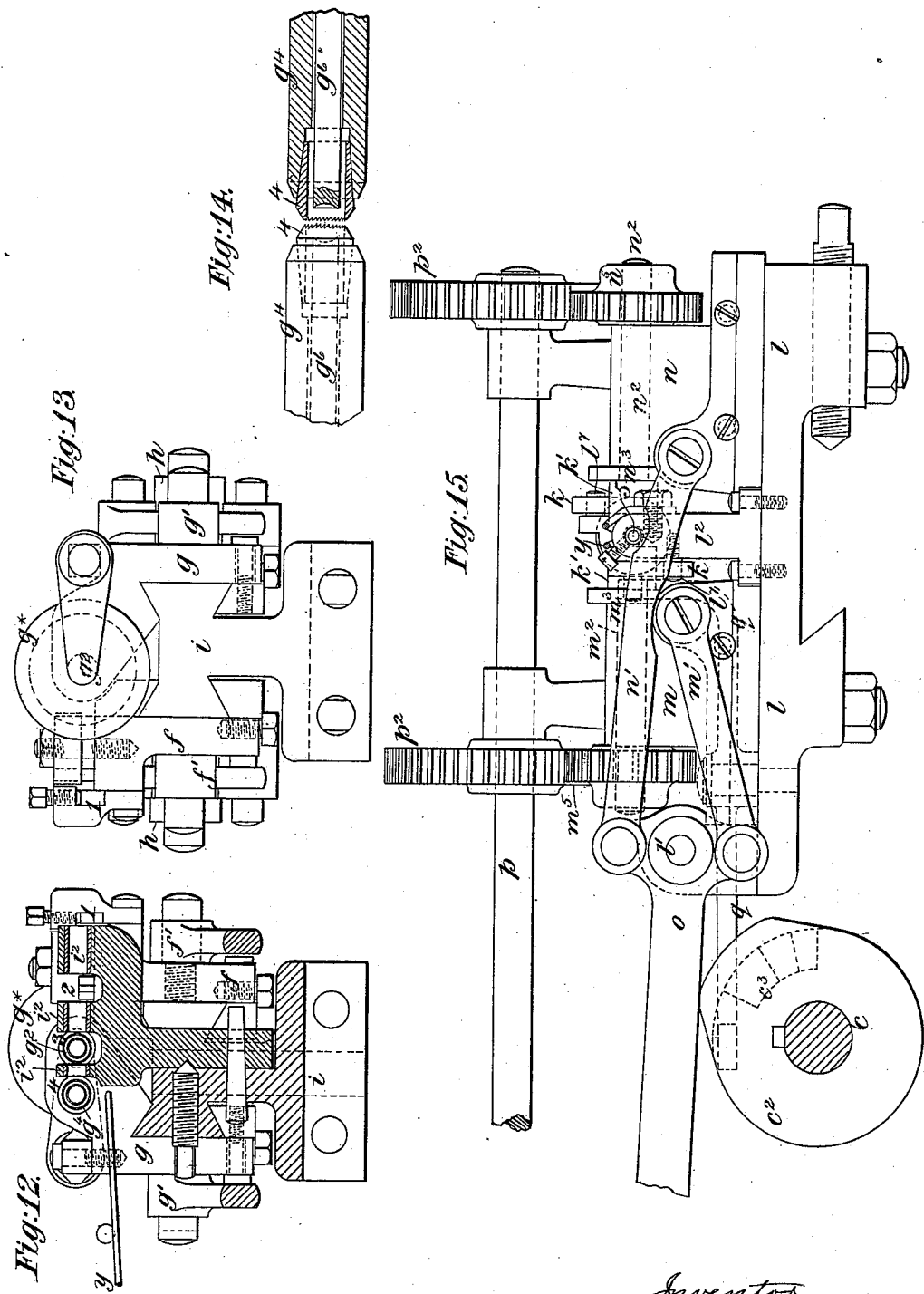
Attest
Edward Stew
Geo. L. Wheelock
Inventor
William Hillman
By Knight Bros
Attys (No Model.)  
W. HILLMAN.  
MACHINE FOR MAKING BALLS.  
No. 333,301. Patented Dec. 29, 1885.
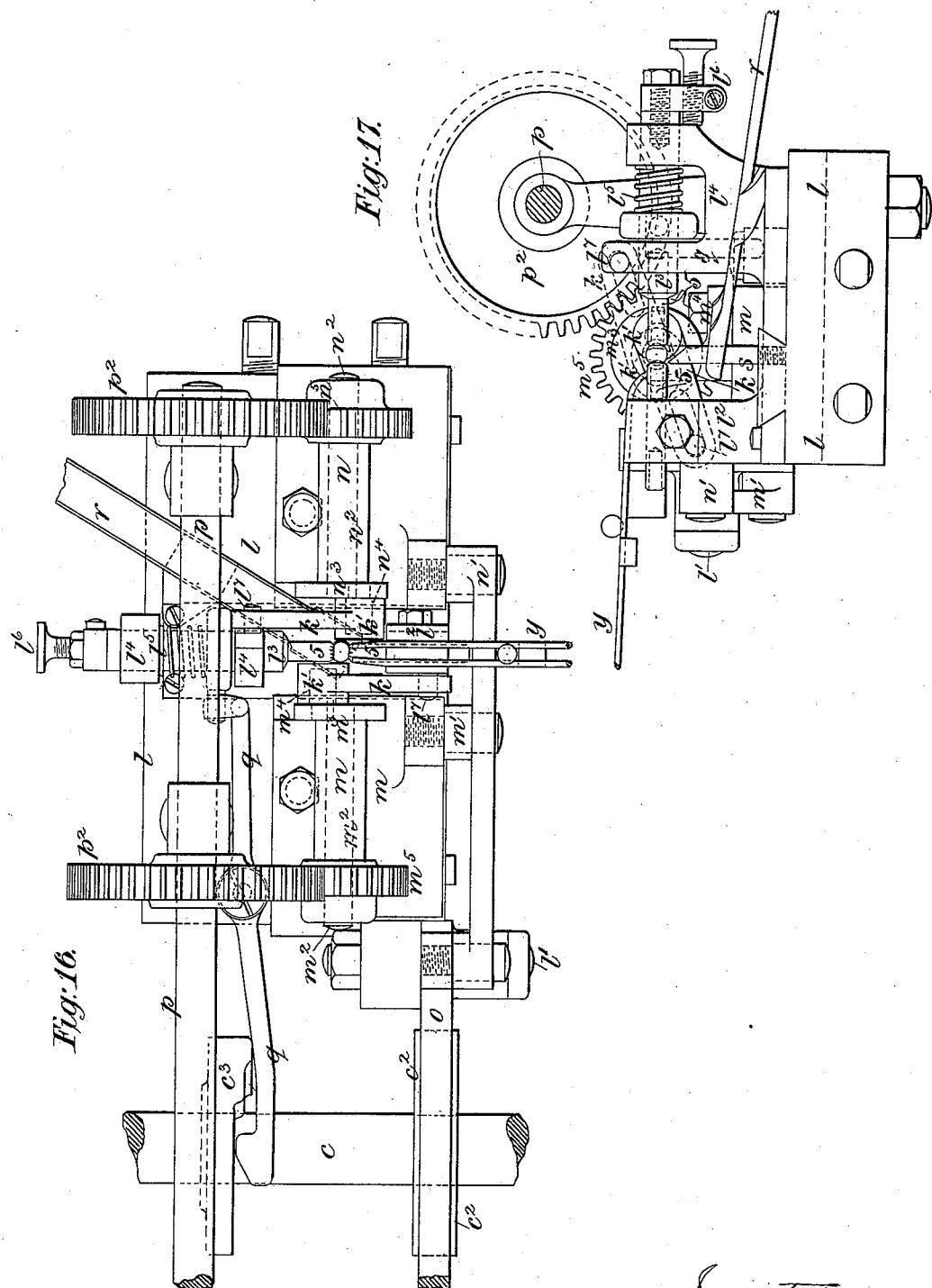

UNITED STATES PATENT OFFICE.

WILLIAM HILLMAN, OF PREMIER WORKS, COVENTRY, COUNTY OF WARWICK, ENGLAND, ASSIGNOR OF FIVE-EIGHTHS TO WILLIAM HENRY HERBERT AND GEORGE BEVERLY COOPER, OF SAME PLACE.

MACHINE FOR MAKING BALLS.

SPECIFICATION forming part of Letters Patent No. 333,301, dated December 29, 1885.

Application filed September 9, 1885. Serial No. 176,621. (No model.)

*To all whom it may concern:*

Be it known that I, WILLIAM HILLMAN, a subject of the Queen of Great Britain, residing at the Premier Works, Coventry, in the county of Warwick, England, velocipede manufacturers, have invented Machinery for Making Balls or Spherical Rollers, of which the following is a specification.

The invention consists of automatic machinery for making balls or spherical rollers, and the action is such that if a straight rod of round metal or other material, slightly larger than the size of the balls or rollers required to be made, be properly fixed in the machine and the latter put in motion, a certain number of balls or rollers can be made with so little attention on the part of the operator that he is able to attend to and to keep a number of similar machines in constant operation.

My invention is represented in the accompanying drawings, of which the following is a description.

Figure 1 is a front elevation, Fig. 2 is a plan, Fig. 3 is a left-hand end view, and Fig. 4 is a right-hand end view, of machinery constructed according to my invention. Fig. 5 is an end elevation of the head stock. Fig. 6 is a back elevation of the same. Fig. $6^a$ is a similar view, but with the lever $a^8$ removed; and Fig. 7 is a plan of the running head-stock and parts carried thereby, and Fig. 8 is an under side view of part of the same. Figs. 9 and 10 are two opposite side elevations. Fig. 11 is a plan. Fig. 12 is a cross-section drawn on the line 1 1 of Fig. 10; and Fig. 13 is a front end elevation of the forming apparatus. Fig. 14 is a separate sectional view of the last pair of forming-cutters. Fig. 15 is a side elevation. Fig. 16 is a plan of the finishing apparatus, and Fig. 17 is a front elevation of the latter with the front slide, front wheels, and some other parts removed.

The body of the machine consists of a bed, A, similar to that of a lathe, preferably of T-shaped section, mounted upon legs or standards B, which may be of any ordinary or suitable form. A table or tray, C, is fixed to the standards B to catch the oil or other lubricating fluid used, and to receive the turnings. A running head-stock, $a$, with suitable hollow mandrel, $a'$, is fitted to slide along the bed A. The mandrel holds the bar or rod $x$ of metal or other material by means of a set-screw, $a^2$, as shown, (or it may be by a chuck,) and rotates with it. Two brackets, D, are bolted to the bed A, one to each end thereof, and they carry in suitable bearings a feed-screw, $b$, a cam-shaft, $c$, and a main driving-shaft, $d$. The driving-shaft $d$ has on it a fly-wheel, which may be used as a hand-wheel, ordinary fast and loose pulleys, $d^2$ $d^3$, and a long drum-pulley, $d^4$, (or it might be a sliding pulley,) which communicates motion to the mandrel $a'$ of the running head-stock $a$, by means of a belt or chain, $d^5$, passing partly around the pulley $d^4$ and partly around the pulley $a^3$, fixed to the hollow mandrel $a'$.

The cam-shaft $c$ is rotated at the necessary slow velocity in the following manner: On the main driving-shaft $d$ is fixed a sprocket-wheel, $d^6$, which, by means of a chain, $d^7$, gives motion to a sprocket-wheel, $d^8$, revolving loosely on the cam-shaft $c$. To the sprocket-wheel $d^8$ is fixed a toothed pinion, $d^9$, which meshes with a toothed wheel, $d^{10}$, to which is fixed a toothed pinion, $d^{11}$, which meshes with and gives motion to a toothed wheel, $c'$, fixed on the cam-shaft $c$. The toothed wheel $d^{10}$ and pinion $d^{11}$ are mounted on a stud or axle, $d^{13}$, fixed to an arm or lever, $d^{14}$, which is mounted on a stud, D', fixed to one of the brackets D, by which means the motion of the cam-shaft $c$ can be instantly stopped by turning the arm or lever slightly on the stud D'. Other suitable means may, however, be employed for communicating the necessary slow motion to the cam-shaft $c$.

The feed-screw $b$ works in a nut, $a^4$, which is attached to the head-stock, and which is constructed and operated as follows: The nut $a^4$ is formed in two halves, each of which is formed on or fixed to a slide, $a^5$, which half-nuts and slides are capable of sliding in reverse directions to each other on a guide-bar, $a^6$, fixed to the running head-stock $a$. To this guide-bar $a^6$ is fixed a stud or axis, $a^7$, on which is mounted a lever, $a^8$, which is formed with two slots, $a^9$, one on each side of its axis $a^7$. These slots $a^9$ receive studs or pins $a^{10}$ fixed one to each slide $a^5$. Thus when the parts are in the position shown in the drawings, the two parts of the nut $a^4$ are in the position to receive motion from the feed-screw $b$; but when the longer arm of the lever $a^8$ has been raised by the cam $b'$ on the feed-screw $b$, acting against the stud or projection $a^{11}$, the two parts of the nut $a^4$ are separated from each other, so that the feed-screw $b$ no longer acts upon the same, and the motion of the running head-stock $a$ is thereby stopped. Other means may, however, be adopted for arresting the motion of the running head-stock when it has arrived at a given position of its traverse. The feed-screw $b$ has an intermittent motion imparted to it by a segmental toothed wheel, $e$, which gears into a spur-pinion, $b^2$, keyed on the feed-screw $b$. The segmental toothed wheel $e$ is keyed or otherwise fixed to the cam-shaft, and is like a spur-wheel with some of its teeth removed. The teeth of such mutilated toothed wheel $e$ are preferably made adjustable on their carrying-disk. The pitch of the feed-screw $b$ is preferably equal to the length of metal required to make one ball—that is to say, if the machine is arranged for making balls of five-sixteenths of an inch in diameter, the feed-screw should have a pitch of three-eighths of an inch, and the intermittent gear should give it exactly one revolution for every ball that is made, so as to advance the rod or bar $x$ the required distance. The pitch of the screw $b$ and the method of giving it the above-named intermittent motion may, however, be varied, provided that the screw $b$ is caused to give the required feed to the rod or bar $x$ of metal or other material within the limit of time during which the cutters are not in operation on the work.

The balls are formed by a row of cutters, 1 2 3 4, which are mounted on slides $f f g g$, and are moved to and from the work by links $f'$ $g'$ and duplex levers $h$, or by other suitable means. There are two pairs of these slides—two at the back and two at the front of the work. They are fitted in the usual way to a suitable slide-rest, $i$, which is fixed to the bed A of the machine at right angles with its length.

The levers $h$ have for their fulcra studs $i'$, fixed at the back end of the slide-rest, one on each side thereof. Their power ends rest upon cams $c'$, fixed on the cam-shaft $c$, which are shaped to give the slides, and consequently the cutters, the necessary slow feed for cutting, and allow them to return quickly and remain stationary while the feed to the rod or bar $x$ is taking place. Weights $h'$ keep the levers $h$ in contact with the peripheries of the cams $c'$, and loose bearing or friction pieces $h^2$ are fitted to the levers $h$, where they rest upon the cams $c'$, and set-screws $h^3$ are fitted through the levers $h$ to act upon these loose friction or bearing pieces $h^2$, to adjust the traverse of the slides $f f g g$. Each pair $f g$ of slides carries two pairs of cutters. The two first pairs of forming or roughing cutters 1 2 are flat, somewhat similar to ordinary slide-rest lathe-tools in form and method of fixing to the slides, those on one side of the rod or bar $x$ being fixed with their cutting-faces downward, and on the other side with their cutting-faces upward, all the cutting-faces being on a line with the center of the work. The third pair, 3, are hollow grinding-cutters. They are held in and rotated by spindles $g^2$, mounted in suitable bearings carried by the slide $g$, and driven by belts $g^3$, which pass around pulleys $g^*$, and thence around pulleys $j'$, fixed on a cross-shaft, $j$, which receives its rotary motion from the driving-shaft $d$, by means of beveled wheels $d^{15}$ $j^2$, or such spindles $g^2$ may receive their rotary motion in other convenient manner. The fourth pair of cutters, 4, are also hollow grinding-cutters held in and rotated by spindles $g^4$, similar to those $g^2$ of the third pair of cutters 3, and geared with them by spur-pinions $g^5$. These cutter-spindles $g^4$ are preferably hollow, as shown more clearly at Figs. 11 and 14, and a spring push-piece, $g^6$, is inserted in each, which is so arranged as to press against the ball while it is being cut off from the rod or bar $x$, and thereby prevent its being jammed into either of the cutters 4. The bar or rod $x$, of metal or other material, rotates between the cutters 1 2 3 4 in a bearing or guide, $i^2$, which is fixed to the slide-rest $i$, and which has slots or cavities to admit the cutters 1 2 3 4, where they act upon the work.

In addition to the above-described forming-cutters 1 2 3 4 a pair of finishing-cutters, 5, are arranged at a lower level, so that when the ball is cut off from the rod or bar it runs down a suitable way, $y$, and falls between them and between a pair of oscillating planes, $k'$, by which they are rotated in every possible direction, so as to cause the finishing-cutters to act upon every part thereof. This finishing apparatus further consists of a slide-rest, $l$, fixed at right angles to the bed A, and having mounted thereon a pair of slides, $m$ $n$, which are moved to and from the work by means of links $m'$ $n'$, and duplex lever $o$, mounted on a stud or axis, $l'$, fixed to the slide-rest $l$, the power end of which lever $o$ rests upon a cam, $c^2$, fixed on the cam-shaft $c$, and such lever $o$ may in some cases be provided with a loose friction or bearing piece where it rests upon the cam $c^2$, and with a set-screw to act upon this loose friction or bearing piece to adjust the traverse of the slides $m$ $n$. Weights $o'$ are fixed on the levers $o$ to keep them in contact with the cams $c^2$. On these slides $m$ $n$ are mounted in suitable bearings a pair of rotating shafts, $m^2$ $n^2$, one on each slide and in a direct line with each other. Each of such shafts $m^2$ $n^2$ has on its front end a disk, $m^3$ or $n^3$, in which is fixed a crank-pin, $m^4$ or $n^4$, on which the boss $k'$ of a lever, $k$, freely works, the end of such lever $k$ being controlled by the arm thereof (which is suitably slotted) working on a fixed stud, $l^7$, so as to give, in combination with the crank-pin $m^4$ or $n^4$, an oscillating eccentric motion to the boss thereof. The faces of the bosses $k'$ of these levers $k$ form the pair of oscillating planes $k'$, hereinbefore referred to, and they are preferably slightly grooved with an annular groove or race to insure a firm grip of the ball. The diameter of the race should be equivalent to the stroke of the crank-pin. The crank-carrying shafts $m^2 n^2$ are rotated in the same direction and at the same speed by suitable gearing from the main driving-shaft $d$, as follows: On the shaft $d$ is fixed a beveled toothed pinion, $d^{16}$, which meshes with a beveled toothed wheel, $p'$, fixed on a cross-shaft, $p$, on which are also fixed toothed wheels $p^2$, which mesh with and give motion to toothed pinions $m^5 n^5$, fixed on the shafts $m^2 n^2$. The arrangement of the shafts $m^2 n^2$ in respect to their crank-pins must be such that one crank-pin is always half a revolution in advance of the other crank-pin. The ball or roller in process of being finished will then be rolled by the oscillating plane $k'$ of one lever $k$ in diametrically-opposite directions to the other—that is to say, if the face of one lever is rolling the ball in directions which may be described as up and to the right, the face of the other lever will roll it down and to the left, the consequence being that the ball is kept revolving in one spot, irrespective of the cutters which act upon them, and will continue to so revolve if the finishing-cutters be removed altogether. The finishing-cutters 5 do not necessarily revolve. They are cylindrical and may be caused to separate from each other, or, as shown in the drawings, one may be fixed and the other caused to move away therefrom when required by means of a lever, $q$, actuated by a cam, $c^3$, on the cam-shaft $d$ at the moment when the ball is cut off by the last pair of forming-cutters 4, thereby allowing the finished ball to fall into a trough, $r$, which conveys it to a suitable receptacle. In this position of the parts, a ball coming from the last pair of forming-cutters 4 is enabled to drop into position between such finishing-cutters 5, a suitable support, $s$, being placed vertically underneath the said ball to hold it in position till the parts are again pressed forward, so as to bear against the same. This support $s$, as shown in the drawings, is a fixture; but when the machine is used for turning comparatively large balls, such as billiard-balls, the said support is a movable one, and is moved out of the way when the finished ball is ready to drop out from between the oscillating planes $k'$.

The fixed finishing-cutter 5 is held rigidly, but with capability of adjustment in a bearing formed in a standard, $l^2$, fixed to the slide-rest $l$, and the movable finishing-cutter 5 is held in a mandrel, $l^3$, which is mounted with capability of sliding in bearings formed in a standard, $l^4$, fixed to the slide-rest $l$, such movable finishing-cutter 5 being pushed up to its work by a spiral spring, $l^5$, acting against a boss on the mandrel $l^3$, and it is at the required times drawn back by the means before described, while a screw-stop, $l^6$, determines the distance between the two cutters 5.

If desired, the finishing mechanism may constitute a separate machine.

Where one machine only is used it is provided with an ordinary pump having suction and delivery valves, and is operated by an eccentric on the drum-shaft automatically to pump the oil or other lubricating fluid from a well, $C'$, in the table or tray $C$, to a reservoir, from which pipes convey it to the various cutters, and where a number of these machines are employed one large independent pump, mounted in the ordinary way, may be employed to supply the whole. I have not shown this arrangement in the drawings, as such will be readily understood by the above description.

The operation of the machine is as follows: The running head-stock $a$ is first placed at its extreme position at the left hand of the bed $A$. A rod or bar, $x$, of metal or other material, is then passed through the hollow mandrel $a'$ and fixed in position by the set-screw $a^2$, so as to rotate therewith, the right-hand end of the rod or bar $x$ being supported by the bearing or guide $i^2$, and being in position to be acted upon by the first pair of cutters, 1, which make a groove in the same, representing a space between a pair of balls or rollers. The cutters then separate, and the said rod or bar $x$ is then advanced to the second pair of cutters, 2, which further act upon the same so as roughly to shape the balls or rollers. The cutters again separate, and the rod or bar $x$ is again advanced to the third pair of cutters, 3, which nearly complete the formation, leaving only a small neck or connection between them, after which the cutters again separate, and the rod or bar $x$ is advanced to the fourth pair of cutters, 4, which further finish the ball and cut it off from the rod or bar $x$, when the ball runs down the inclined way $y$ and falls between the finishing-cutters 5 and the oscillating rolling-planes $k'$, where the small projection left thereon which formed the connection with the rod or bar $x$ is removed, and the ball or spherical roller finished in readiness (when made of steel) for the subsequent processes of hardening, grinding, and polishing, which are conducted in the ordinary manner, except that as balls or spherical rollers made by my machinery are truer and more uniform in size than those made by the ordinary methods, less grinding is required after the hardening thereof.

After the finishing-cutters have completed their action on the ball or roller, they and the oscillating planes $k'$ are caused to separate from each other, when the ball falls and is conducted by the trough $r$ to a suitable receptacle, as hereinbefore described.

I have shown and described cams, weights, and springs for producing the reciprocating movements of the several cutters and other parts; but I desire to have it understood that these elements may be used interchangeably, as equivalents, without departing from my invention.

I am aware that it has been proposed to finish cannon-balls by means of an annular milling-tool, which is rotated upon its axis and pressed into contact with the surface of said ball, while the latter is revolved by means of a pair of rotating mandrels, each carrying at one extremity a chuck having a sphero-segmental cavity embracing said ball at diametrically-opposite points.

Having now particularly described and ascertained the nature of my said invention, and in what manner the same is to be performed, I declare that what I claim is—

1. In a machine for making balls, the combination, with a rotary mandrel in which the blank-bar is secured and an intermittent feed, of a reciprocating cutter moved toward the axis of said blank during the intervals between the feeding actions, as set forth.

2. In a machine for making balls, the combination, with a rotary mandrel and an intermittent feed, of a series of cutters for acting simultaneously and each in succession upon a given part of the blank, as set forth.

3. In a machine for making balls, the combination, with a rotary mandrel and a blank-bar carried thereby, of a cylindrical cutter reciprocating transversely to the axis of the blank-bar, as set forth.

4. In a machine for making balls, the combination, with a rotary mandrel, of a cylindrical cutter rotating upon its axis and reciprocating transversely to the axis of the blank, as set forth.

5. In a machine for making balls, the combination, with a rotary mandrel, of a pair of rotating cylindrical cutters reciprocated in the plane of their axes and bearing at diametrically opposite points upon the blank, as set forth.

6. The combination, with a pair of reciprocating cutters, of a fulcrumed lever and a pair of links connecting the respective cutters with said lever upon opposite sides of its fulcrum, as set forth.

7. The combination, with a pair of cutters and the slides to which they are respectively secured, of a lever fulcrumed to the frame of the machine, links connecting the respective slides with said lever upon opposite sides of its fulcrum, and a cam for controlling the position of said lever, as set forth.

8. In a machine for making balls, the combination, with a rotary mandrel carrying the blank-bar and an intermittent feed for moving said blank-bar forward, of a series of cutters operating successively in the formation of the ball reciprocated alternately with the feed, as explained.

9. The combination, with two rotary cutters and a block in which they are mounted side by side, of intermeshing pinions secured to their spindles and means for rotating one of said spindles, as set forth.

10. The combination, with a cylindrical cutter, of a spring push-piece located within said cutter, substantially as set forth.

11. In a machine for making balls, a pair of planes bearing upon opposite sides of the ball and moved in a circular direction, in combination with the finishing-cutter, substantially as set forth.

12. The combination, with the finishing-cutter, of a pair of planes bearing against opposite sides of the ball and moved in a circular direction, substantially as described.

13. The combination, with the finishing-cutter, of a pair of planes bearing against the ball at diametrically-opposite points, and moved in the same circular direction, one in advance of the other, as and for the purpose set forth.

14. The combination, with the finishing-cutter, of a pair of planes bearing against said ball at diametrically-opposite points, and a pair of wrist-pins to which said planers are secured, said wrist-pins being placed one in advance of the other and moved in the same direction, as set forth.

15. In a machine for making balls, the combination, with the forming-cutters and a trough or chute, of the finishing-cutters and a rest for supporting the ball between said cutters while they are closing together, substantially as set forth.

16. In a machine for making balls, the combination of a pair of finishing-cutters and a spring for forcing them together, as set forth.

17. The combination, with a pair of finishing-cutters and a spring for forcing them together, of a stop for limiting their approach, substantially as set forth.

18. The combination, with a pair of cutters and a spring for forcing them together, of a cam for opening them, as set forth.

19. In a machine for making balls, the combination of a rotary mandrel carrying the blank-bar, an intermittent feed, a series of cutters acting simultaneously and each in succession upon a given portion of the blank, and a pair of finishing-cutters, substantially as set forth.

20. The combination, with the head-stock, of a lever fulcrumed thereto, a two-part nut connected with said lever upon opposite sides of its fulcrum, and the feed-screw with which said nut meshes, substantially as set forth.

21. The combination, with the rotary mandrel, of the non-rotating cutters for channeling the blank-bar and the rotating cylindrical cutters for shaping the ball, substantially as set forth.

22. The combination, with the rotary mandrel carrying the blank-bar, of the series of cutters for acting simultaneously and each in succession upon a given portion of said bar and a support or guide located between each two cutters, as set forth.

23. The combination, with the finishing-cutter, of a pair of non-rotating planes bearing against opposite sides of the ball and moved in a circular direction, substantially as set forth.

24. The combination, with the finishing-cutter, of a pair of planes held in contact with the opposite sides of the ball with a yielding pressure and moved so as to rotate said ball, as set forth.

25. In a machine for finishing balls, the combination, with means for imparting rotation thereto, of a pair of finishing-cutters pressed into contact with the ball at opposite points, as set forth.

WILLIAM HILLMAN.

Witnesses:
STEPHEN HERBERT NORTON,
1 *Clifton Terrace, Lower Ford Street, Coventry.*
JOSEPH WALSGROVE,
*Wheatley Street, Coventry.*